United States Patent [19]
Langan

[11] 3,757,239
[45] Sept. 4, 1973

[54] DIRECT CURRENT AMPLIFIER DRIFT REDUCTION METHOD

[75] Inventor: Marion J. Langan, Huntsville, Ala.

[73] Assignee: Avco Corporation, Huntsville, Ala.

[22] Filed: Dec. 2, 1971

[21] Appl. No.: 204,228

[52] U.S. Cl. .................... 330/9, 330/23, 330/30 D, 330/35

[51] Int. Cl. .................... H03f 1/02

[58] Field of Search .................... 330/30 D, 23 C, 9

[56] References Cited

UNITED STATES PATENTS

| | | | |
|---|---|---|---|
| 3,346,817 | 10/1967 | Walker et al. | 330/23 |
| 3,569,849 | 3/1971 | Cassidy et al. | 330/30 D X |

*Primary Examiner*—Nathan Kaufman
*Attorney*—Charles M. Hogan

[57] ABSTRACT

Herein disclosed is a method of selecting the resistive and temperature co-efficient parameters of emitter resistors in the differential input transistor pair of a direct current amplifier. The amplifier comprises said pair together with cascaded amplifying means and means for degeneratively applying feedback signals to said pair. The amplifier further comprises means for equating the collector currents of said pair and adjusting the output voltage to zero for a starting condition under which said resistive parameters are zero. The method comprises these steps, in sequence:

Changing the resistive parameters from zero at the starting condition to a known value of X each, measuring the potential across each said resistive parameter, changing each resistive parameter to a value of X plus Δ X, noting the resultant change in said potential, thus determining the relationship between ohmage change and change in said potential, again reducing the resistive parameters to zero, and subjecting the amplifier to a known temperature change, determining the drift characteristic of the amplifier referred to the input (i.e., the relationship between ambient temperature change and change in said potential), and utilizing the above relationships to predetermine desired resistive and temperature co-efficient parameters which should be possessed by said emitter resistors.

1 Claim, 2 Drawing Figures

INVENTOR.
MARION J. LANGAN
BY Charles M. Hogan
ATTORNEY.

DIRECT CURRENT AMPLIFIER DRIFT REDUCTION METHOD

BACKGROUND OF THE INVENTION

In the design and utilization of direct current amplifiers it is necessary to minimize the amount of drift resulting from changes in ambient temperature. The use of resistors with temperature co-efficients provides immunity to drift but the problem of determining economically the optimum values of resistors involved is a difficult one.

An object of the invention is to provide a method for the rapid empirical determination of the optimum values of inserted resistors in the input stage of a direct current amplifier. The technique herein taught not only compensates for the inherent drift characteristics of the input transistor pair but also, in the case of fixed gain, for the secondary drift characteristics produced by variations in the passive elements of the first stage and in both active and passive elements of subsequent stage of amplification.

Various prior-art endeavors have been mde to amplify low level direct current signals without introducing errors due to the drift characteristics of the amplifier under changing ambient temperatures. The chopper stabilization technique has been employed, with the disadvantages of higher cost and the introduction of chopper noise. The present invention uses the balanced differential input pair approach and provides a substantial improvement therein.

For a better understanding of the invention, together with other and further objects, advantages and capabiliites thereof, reference is made to the following description of the drawings.

DESCRIPTION OF THE DRAWINGS

FI. 1 is a circuit schematic of a direct current amplifier employing a differential input transistor pair in which resistors are inserted in accordance with the techniques of the invention.

Figure 1:
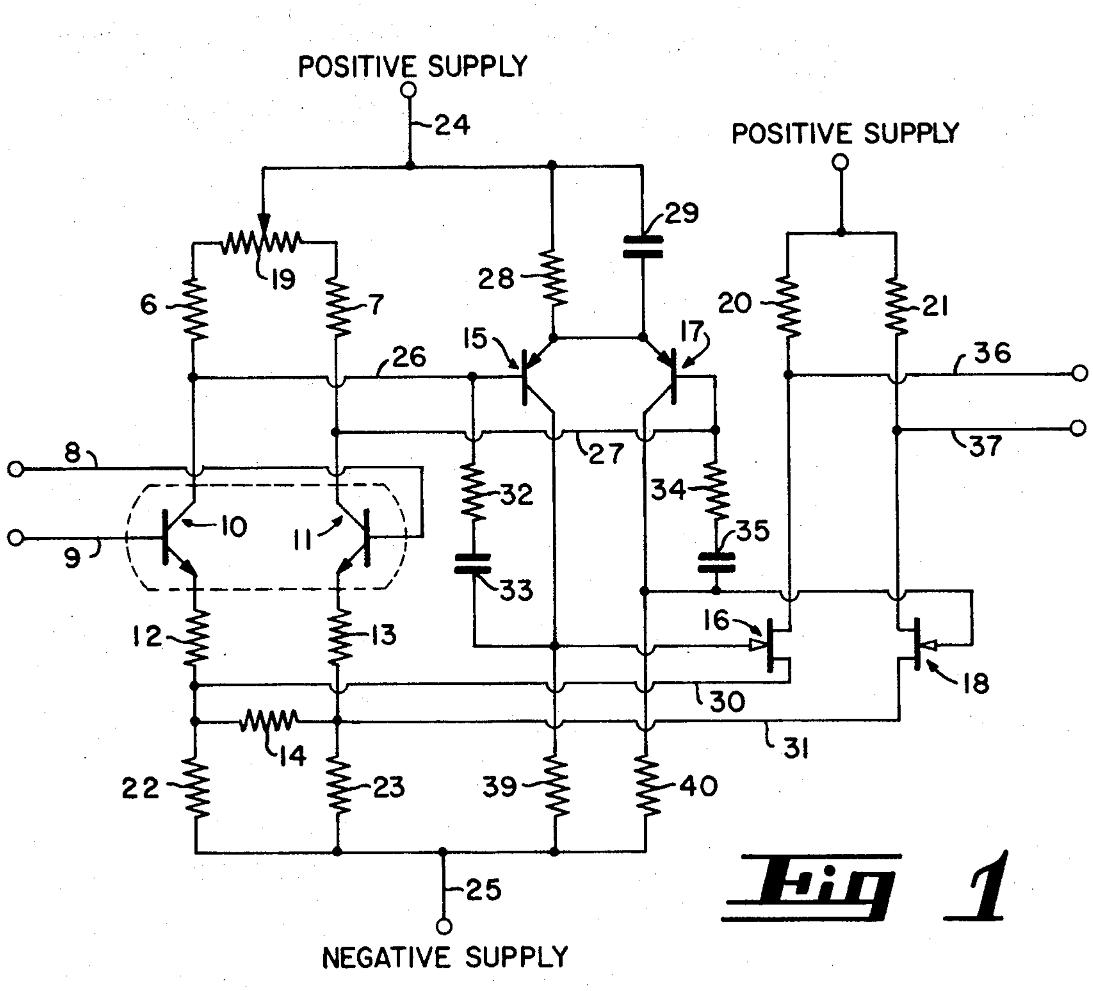
Referring to FIG. 1, there are shown an NPN transistor differential input pair 10 and 11, the bases of which are connected to respective input signal lines 9 and 8. The emitter-collector circuits of the transistor pair 10, 11 are arranged in a bridge configuration with respective collector load resistors 6 and 7 connected to the end leads of potentiometer 19. Between the negative supply line 25 and the emitter of transistor 10 is a series of arrangement of resistors 22 and 12. Resistors 23 and 13 are similarly connectd in series between the emitter of transistor 11 and supply terminal 25. The collector output of transistor 10 is connected by line 26 to the base of transistor 15 and the collector output of transistor 11 is similarly connected by line 27 to the base of transistor 17. The emitter resistor 28 of transistors 15 and 17 and the sliding tap on potentiometer 19 are connected to the positive supply line 24, resistor 28 being by-passed by capacitor 29. The collector outputs of transistors 15 and 17 are respectively connected to the gate electrodes of field effect transistors 16 and 18. The respective source electrodes of these transistors have negative feedback connections 30 and 31 to the junction of resistors 12 and 22 and the junction of resistors 13 and 23, respectively. Series resistance-capacitance networks 32, 33 and 34, 35 respectively, are connected between base and emitter of transistors 15 and 17, respectively.

The drain electrodes of transistors 16 and 18 provide outputs at 36 and 37. The elements 39 and 40 are collector resistances, in series with line 25, for transistors 15 and 17. Resistor 14 is connected between the junction of resistors 12, 22 and the junction of resistors 13, 23.

Figure 2:
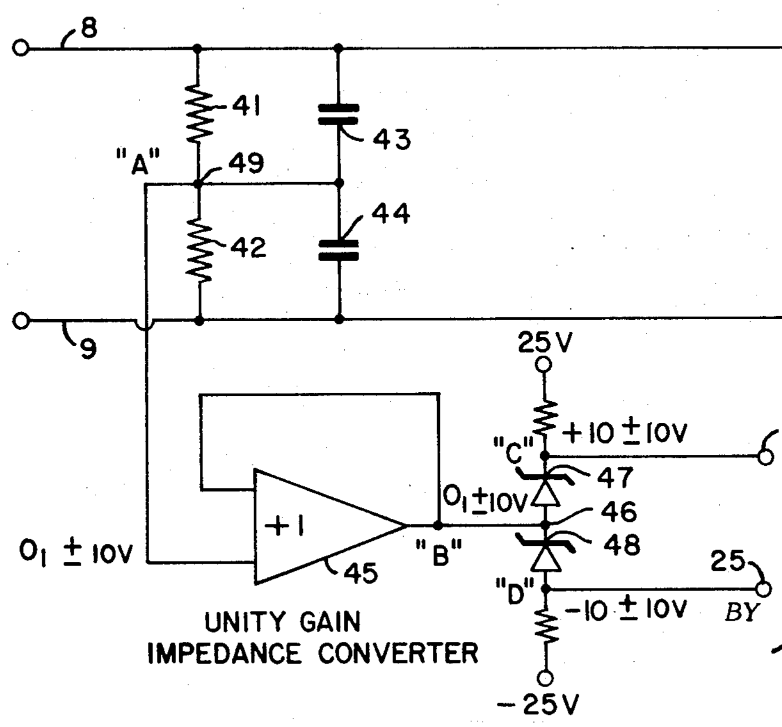
FIG. 2 illustrates the manner in which both the input lines are slaved to the common mode potential in the FIG. 1 embodiment.

Referring now specifically to FIG. 2, a network comprising resistors 41 and 42 and capacitors 43 and 44 provids a center tap 49, symmetrically located with respect to input lines 8 and 9. This center tap is connected to a unity gain impedance converter 45, the output of which is connected to the junction 46 of zener diodes 47 and 48. Diode 47 is between center tap 46 and line 24. Diode 28 is between center tap 46 and line 25.

Assume that the inputs to transistors 10 and 11 are both at zero volts, then the center tap 49 will be at zero volts and point B at zero volts and at low impedance. Also assume that diodes 47 and 48 are 10 volt zener diodes. Under these assumptions point C will be at 10 volts and point D at minus 10 volts.

Now let it be assumed that the inputs to transistors 10 and 11 both change to 10 volts. Then points A and B will change to 10 volts and point C to 20 volts and point D to zero volts. If it be assumed that the inputs to transistors 10 and 11 change to minus 10 volts, then point C will change to zero volts and point D to minus 20 volts. The potential difference between the supply line 24 and the supply line 25 is always 20 volts. The potentials at C and D vary in phase, on a unity gain basis, with the common mode voltage.

Transistors 10 and 11 of FIG. 1 are a matched NPN transistor pair as conventionally supplied in a single can and/or on a sngle substrate in an effort to provide an identical temperature environment. Variations in ambient temperature, then, are presumed to affect each half of the transistor on an equal basis and the resultant variations in performance of the two transistors are presumed to be matched. These "matched" variations in performance appear as common mode variations to the passive elements of the first amplifier stage and to the active and passive elements of the second amplfier stage. Through the use of circuitry in the second and subsequent stage of the amplifier that is essentially immune to common mode variations in the outputs of the first stage, amplification is achieved with relatively stable drift characteristics. The degree of success achieved is primarily a function of the match in characteristics achieved in the two halves of the input transistor. Drifts contributed by stages subseqent to the first stages are essentially diminished in their effect by the gain factor that precedes them. For example, if the first stage has a voltage gain of 100, the effective drift contribution of the second stage is divided by 100 when referencing the drift characteristic of an amplifier to its input.

The state of the art for matching the characteristics of a transistor pair in the manufacturing process is approximately 5 to 10 microvolts per degree Centigrade (C.). That is, for evey degree C. change of ambient temperature, a mismatch develops in the base-to-emitter potentials that is equivalent to the application of a changing signal potential of 5 to 10 microvolts. By the expensive process of selection, transistor pairs with drift rates in the vicinity of 2 microvolts per degree Centigrade may be obtained. In addition, it has been established, as described in U. S. Pat. No. 3,185,932, N. C. Walker, that by adjustment of the currents of the two halves of an input transistor such that the base-to-emitter potentials are equal, a transistor pair that may be expected tohave a drift characteristic of approximately 10$\mu v$/° C under ordinary usage may be reduced to the vicinity of 2$\mu v$/° C.

This invention provides a method for improving upon the drift characteristics of amplifiers. The technique described herein is used (1) to reduce the drift characteristic of a transistor pair from an inherent characteristic of greater than 10$\mu v$/° C to better than 0.5$\mu v$/° C, and (2) for a fixed gain multi-stage amplifier, to modify the drift characteristics of the input stage to significantly compensate for the secondary drift contributions of the passive elements of the first stage, the active and passive elements of the second and subsequent stages, and also the variations which may occur due to the supply voltage variations associated with power supplies that are subjected to the same ambient temperature changes as the basic amplifier. This second features enables the usage of less expensive components within the amplifier and the associated power supplies. It also enables the construction of amplifiers with relatively low closed loop gains, that maintain low drift rates referred to the amplifier input in the face of variations in associated power supply voltages.

Referring again to FIG. 1, the invention facilitates empirical determination of the values of two resistors inserted in the amplifier to achieve drift compensation. The resistor values to be determined are those of resistors 12 and 13. These resistors are initially shorted at ambient temperature.

Before proceeding further with the method of selecting these resistors, the basic amplifier is further considered. The amplifier consists primarily of two high gain closed loops interconnected by resistor 14. The first closed loop is made up of transistors 10, 15, 16 and associated resistors. A positive change in the base voltage of transistor 10 causes an increase of current in transistor 10 which is amplified by transistor 15 to cause a positive excursion in the gate voltage of field effect transistor 16. The source element of transistor 16 follows the gate thus increasing the emitter potential of transistor 10 and reducing the collector current of transistor 10 to approximately the same value as that which existed prior to the positive base excursion. Since this is basically a very high gain feedback loop, the essential result of changing the base voltage on input transistor 10 is to produce a change in the emitter voltage for transistor 10 of almost the same value, and the associated collector current change is very small.

The second closed loop is made up of transistors 11, 17 and 18 and associated resistors. The performance of this second loop is identical to that of the first loop. Now, since the emitter of transistor 10 follows the base of transistor 10 and the emitter of transistor 11 follows the base of transistor 11, with zero voltage difference in the bases of transistors 10 and 11, there will be approximately zero voltage difference between the emitters of transistors 10 and 11. Potentiometer 19 is provided in order to adjust the voltage difference between the emitters of transistors 10 and 11 to exactly zero. Under this condition there will be no current flowing in resistor 14, which is across those two emitters.

Initially the resistor values of the amplifier are selected to provide a small source-to-drain current for transistor 16 and also transistor 18 thus producing voltage drops across resistors 20 and 21. The current that flows through resistor 20 flows through resistor 22 and the current that flows through resistor 21 flows through resistor 23. With zero voltage across resistor 14 the potential difference between ouput lines 36 and 37 is essentially zero. In actual operation, if this output voltage is not zero, resistor 19 may be adjusted to produce zero output by creating a small potential across resistor 14.

As previously explained, under the conditions of a change in the base voltage of transistor 10 or transistor 11, the related emitter follows the base voltage very closely and there is only a minute change in the related collector current. A potential difference between the bases of transistor 10 and transistor 11, however, produces virtually the same potential difference across resistor 14. This potential across resistor 14 produces a current flow that is provided by a change in source-to-drain current of transistor 16 and an opposite change in the source-to-drain current of transistor 18. This current change through transistor 16 and transistor 18 produces a potential difference between lines 36 and 37. This is the amplifier output voltage, and the voltage gain is essentially established by the ratio of the value of resistor 14 to the sum of the values of resistors 20 and 21.

The main point of interest in the above explanation is that the collector currents of transistors 10 and 11, once initially established by resistor values and source potentials, remain substantially unchanged under the condition of changing input potentials. These currents will also remain substantially the same under ambient temperature changes since minute changes in collector currents produce degenerative feedback to the related emitters.

To further assure that the collector currents of transistors 10 and 11 remain constant, the negative supply voltage line 25 and the positive supply voltage line 24 are slaved to the common mode potential of the voltage applied to transistors 10 and 11, as indicated in FIG. 2. Thus if the bases of transistors 10 and 11 are simultaneously changed by, for example, 10 volts, the positive and negative supply voltages will change by 10 volts in the same direction, thus maintaining the original collector currents through transistors 10 and 11.

Now having established that the collector currents of transistors 10 and 11 remain constant, the functions of resistors 12 and 13 may have considered. Since resistor 12 is within the previously explained closed first loop, and resistor 13 is within the second closed loop, the performance of the amplifier will be essentially unchanged if resistors 12 and 13 have the same value and are not unreasonably large. Consider for example, then, that the circuit values are selected to produce a collector current of 25 microamperes for transistor 10 and 25 microamperes for transistor 11. If the values for resistors 12 and 13 are changed from zero to 10 ohms each, a 250 microvolt potential will develop across each resistor, but no potential differnece will be created across resistor 14, and consequently no resultant change in the amplifier output voltage will occur.

If now, the value of either resistor 12 or resistor 13 is changed from 10 ohms to 9 ohms, a change of 25 microvolts will occur across this modified value resistor and this will appear as a 25 microvolt change in the potential across resistor 14. The result is the same as if a 25 microvolt change takes place in the base potential of transistor 10 or transistor 11 and the amplifier output changes accordingly.

Since one knows, or can readily determine, both the forward gain of the amplifier and the collector currents of transistors 10 and 11, one may now short resistors 12 and 13 and subject the amplifier to a known ambient temperature change, of, for example, 20° Centigrade. If the forward gain of the amplifier is 100 and the output changs by 20 millivolts, the drift characteristic of the amplifier is $(20 \times 10^{-3})/(20 \times 100)$ or 10 microvolts per degree Centigrade referred to the input. By changing the input signal at the rate of 10 microvolts per degree Centigrade, in the proper direction, we could maintain the ouput signal at a constant potential. One may now use resistors 12 and 13 in the following manner to achieve the equivalent of changing the input signal at the desired rate and in the proper direction: Since it has been determined that the transistor collector currents are 25 microamperes and that a change of 10 microvolts per degree Centigrade in input voltage is needed, one can produce the desired effect by maintaining the value of resistor 12 constant and changing the value of resistor 13 (or vice-versa, depending upon the required polarity change) at the rate of 0.4 ohms per degree Centigrade. One may accomplish this by employing a 100 ohm resistor to zero temperature coefficient for resistor 12 and a 100 ohm resistor for resistor 13 with a temperature coefficient of four-tenths of 1 per cent per degree Centigrade. A change of 1° Centigrade would produce a voltage change of $0.004 \times 100$ ohms $\times$ 25 micromaperes, or 10 microvolts. Since copper has a positive temperature coefficient of approximately four-tenths of 1 per cent per degree Centigrade, and a value of 100 ohms may be achieved by a relatively small length of reasonable size copper wire, this is a convenient and inexpensive material for resistor construction.

A simple formula, then, for compensating an amplifier with collector currents for transistors 10 and 11 of 25 microamperes, is to utilize a value of resistance for each of resistors 12 and 13 of 10 ohms per microvolt per degree Centigrade drift, with one resistor having zero temperaure coefficient and the other being constructed of copper. Obviously collector currents other than 25 microamperes may be employed, and simple measurement will enable proper modification of the values of resistance to be employed. Obviously, too, resistances other than copper may be employed to provide different temperature coefficients. It is feasible to employ resistors 12 and 13 with opposite polarity temperature coefficients rather than selecting one of the two for zero temperature coefficient so long as the combined result produces the desired effect.

The temperature coefficient of copper is linear and therefore suffices to compensate only for linear drift characteristics. This linear compensation, however, has proven to be adequate to reduce amplifier drift characteristics to less than 0.5 microvolts per degree Centigrade referred to input. Resistances having non-linear characteristics could be employed if it can be determined that a more effective result can be achieved. As explained above, this compensation technique may be used not only to compensate for the drift of the amplifier input stage, but also for the over-all drift of the amplifier which may be subjected to changing supply voltages due to temperature. These combined effects may be non-linear, thus calling for a non-linear resistor temperature coefficient.

While there has been shown and described what is at present believed to be the preferred embodiment of the invention, it will be understood by those skilled in the art that various changes and modifications may be made therein without departing from the scope of the inventon as defined in the appended claims.

Having described my invention, I claim:

1. A multistage differential amplifier having improved drift compensating means comprising:

a pair of signal input terminals;

a pair of signal output terminals;

positive and negative current supply terminals adapted to be connected to an electrical energy source;

an input differential amplifier stage comprising a pair of common emitter transistors, each transistor having having a base and an emitter and a collector, the bases being individually coupled to said input terminals, a potentiometer, having end terminals connected to said collectors and an adjustable terminal connected to said positive supply terminal, for providing collector loads for said transistors, a pair of emitter load networks for said transistors, said emitter networks being connected to said negative current supply terminal, gain determining resistor connected between junction points on said emitter load networks, one of said emitter load networks including, between its respective junction point and its respective emitter, a resistor having a temperaure coefficient proportioned to compensate for drift, and additional amplifier stage means intercoupled between said collectors and said output terminals, said additional amplifier stage means comprising a pair of common-collector transistors each having a base and an emitter and a collector, collector load resistors in series between the collectors of the common-collector transistors and the negative supply terminals, a parallel resistance-capacitance, filter network between both emitters of the common-collector, transistors and said positive current supply terminal, and series resistance-capacticance biasing networks between the bases and collectors of said common-collector transistors, said additional amplifier stage means further including a pair of field-effect transistors having their gates connected to the collector of the common-collector transistors and their sources connected across said balancing resistor to provide degenerative feedback current means and their sources connected directly to said output terminals and individual load resistors between said drains and said positive supply terminal.

* * * * *